3,389,167
2-(DIALKYLAMINO)ETHYL POLYPROPENYL-
SUCCINATES
Malcolm Macfarland Donaldson, Bedford Village, N.Y.,
assignor to American Cyanamid Company, Stamford,
Conn., a corporation of Maine
No Drawing. Filed Mar. 12, 1964, Ser. No. 351,536
4 Claims. (Cl. 260—485)

ABSTRACT OF THE DISCLOSURE

The present invention relates to novel polymeric succinates and to their method of preparation. More specifically, it relates to both a 2-(dialkylamino)ethyl propenylsuccinic tripropenamer and a 2-(dialkylamino)ethyl tetrapropenylsuccinate, each of which can be represented by the formula:

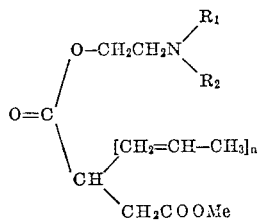

wherein $R_1$ and $R_2$ each represents either hydrogen or lower alkyl from 1 to 4 carbon atoms, $n$ is an integer from 3 to 4 and Me represents either hydrogen, ammonium or an alkali metal such as sodium, potassium or lithium.

The compounds of the present invention can be characterized as light brown to dark brown viscous liquid which are soluble in hydrocarbon solvents, such as toluene and xylene and in polar solvents, such as ethanol or propanol. These compounds are particularly useful as wetting agents and as antistatic agents in the treatment of synthetic fabrics exemplified by polyamides such as nylon, acrylics such as Creslan and polyolefins such as polyproylene fibers.

In accordance with the present invention, the class of compounds defined above, can be prepared by reacting substantially equimolar portions of a propenylsuccinic anhydride and a β-di-(lower alkyl)aminoethanol in an inert hydrocarbon solvent at a temperature above about 35° C.

Illustrative of the propenyl reactants which may be employed herein are, for example, tetrapropenylsuccinic anhydride and tripropenylsuccinic anhydride. The propenyl substituents may be either normal propenyl units or isopropenyl units. Among the lower alkylaminoethanol reactants which can be utilized herein are, for instance, β-(dimethylamino)ethanol, β-(diethylamino)ethanol, β-(di-N-dipropylamino)ethanol, β-(dibutylamino)ethanol and equivalents thereof. Since the overall reaction results in the preparation of a succinic acid, it may be desirable to further react the acid with an alkaline substance such as ammonium hydroxide, sodium hydroxide, potassium carbonate or lithium carbonate, in either a substantially non-aqueous environment containing an inert hydrocarbon solvent or in an aqueous environment containing a polar solvent.

It is an advantage of the present invention that the above-described class of compounds can be prepared at atmospheric pressure and at temperatures above about 35° C. and below about 100° C. In general, a good operating temperature range has been found to be operative from about 35° C. to about 65° C. It is also highly desirable that the reaction be carried out, but not necessarily, in the presence of an inert hydrocarbon solvent.

The invention will be illustrated in conjunction with the following examples which are to be taken merely as illustrative and not by way of limitation. All parts are by weight, unless otherwise stated.

EXAMPLE 1

Preparation of the potassium salt of 2-(diethylamino)-
ethyl tetrapropenylsuccinate 26.7 parts of tetrapropenylsuccinic anhydride (0.1 mol) and 11.7 parts of β-(diethylamino)ethanol (0.1 mol) are added to a suitable reaction vessel equipped with stirrer, condenser and thermometer and containing 100 parts of toluene. An exotherm is developed at 60° C. The reaction is further heated for 2 hours on a steam bath. Thereafter, toluene is evaporated in a rotary evaporator.

A dark brown viscous liquid of yield of 34.8 parts equivalent to 95.2% of theory is obtained. Upon infrared spectrum analysis, this dark brown viscous liquid corresponds to 2-(diethylamino)ethyl tetrapropenylsuccinate. The dark brown viscous liquid is then subjected to treatment with an ethanolic solution of potassium hydroxide. Sufficient alkali is added to increase the pH to 8.5.

EXAMPLE 2

Repeating the procedure of Example 1 in every detail, except that 8.9 parts of β-(dimethylamino)ethanol (0.1 mol) is employed in lieu of the β-(diethylamino)ethanol of said example. A substantially light brown viscous liquid which corresponds to the proposed compound, 2-(dimethylamino)ethyl tetrapropenylsuccinate, is obtained on infrared spectrum analysis.

EXAMPLE 3

To a suitable reaction vessel are added 0.1 mol of tripropenylsuccinic anhydride, 0.1 mol of β-(dipropylamino)ethanol and 100 parts of toluene. After heating for approximately 2½ hours, toluene is evaporated and a dark brown liquid viscous product is obtained in 98% yield. On infrared spectrum analysis, the product 2-(dipropylamino)ethyl tripropenylsuccinate is obtained.

To illustrate the utility of the above-identified class of compounds as antistatic agents, the following examples are provided.

EXAMPLE 4

0.1 part of 2-(diethylamino)ethyl tetrapropenylsuccinate, as prepared in Example 1 above, is dissolved in 100 parts of xylene. A 9 inch x 9 inch sheet of nylon is next immersed in the solution, passed through squeeze rollers and then air dried. The dried sheet is folded over twice in the direction so as to obtain a sheet measuring 2¼ inches x 9 inches. A charge is induced on the sheet by stroking the same with a glass rod for one minute. The sheet is now exposed to carbon particles that have been placed on a table by holding the sheet above the particles. In this test procedure, it is considered that the closer the sheet can be placed near the particles without attraction of the particles, the more advantageous is the antistatic treating agent. In the present instance, even at substantially zero height, there is no attraction observed of carbon particles to the nylon sheet, indicating clearly that the treated cloth possesses antisatic properties in the presence of the tetrapropenylsuccinic compound.

EXAMPLE 5

Repeating in every detail the procedure of Example 4, except that the antistatic property is omitted, the cloth is shown to be static by stroking it for one minute. Carbon particles are immediately attracted to it, up to 2 inches of separation.

I claim:
1. As a composition of matter:
a polymeric succinate characterized by the formula:

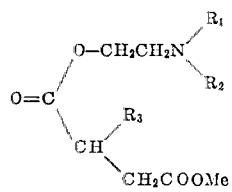

wherein $R_1$ and $R_2$ are substituents selected from the group consisting of hydrogen and lower alkyl having from 1 to 4 carbon atoms, $R_3$ is selected from the group consisting of tripropenyl and tetrapropenyl, and Me is a substituent selected from the group consisting of hydrogen and alkali metal.

2. As a composition of matter according to claim 1: 2-(dimethylamino)ethyl tetrapropenylsuccinate.

3. As a composition of matter according to claim 1: 2-(diethylamino)ethyl tetrapropenylsuccinate.

4. As a composition of matter according to claim 1: 2-(dipropylamino)ethyl tripropenylsuccinate.

References Cited

Finar: Organic Chemistry, vol. I, Longmans, London, England, 1963, p. 374.

LORRAINE A. WEINBERGER, *Primary Examiner.*

RICHARD K. JACKSON, *Examiner.*

T. L. GALLOWAY, *Assistant Examiner.*